July 17, 1928. 1,677,845
M. M. PINNEY
SERVING DISH
Filed Nov. 4, 1927
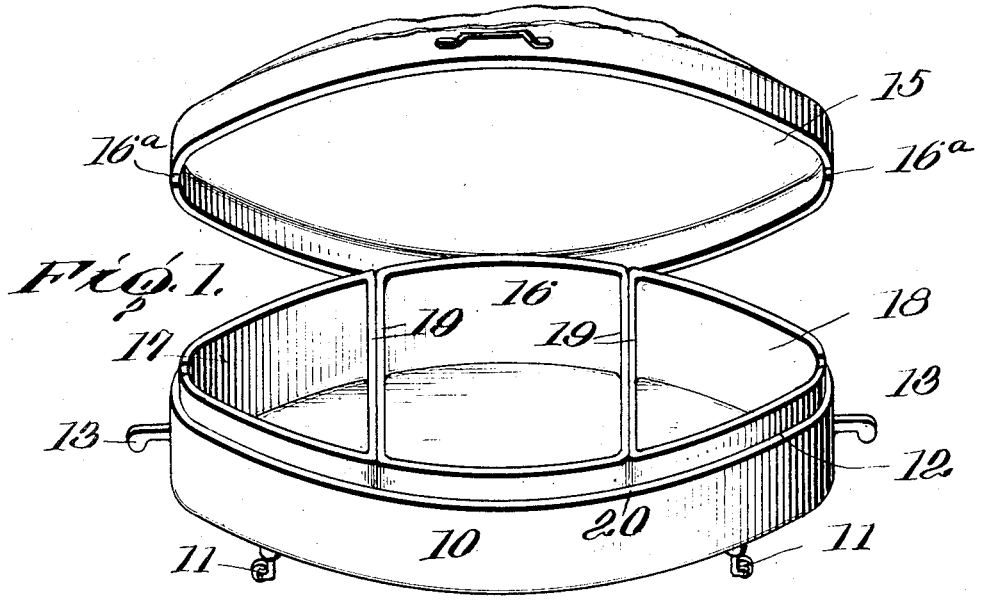
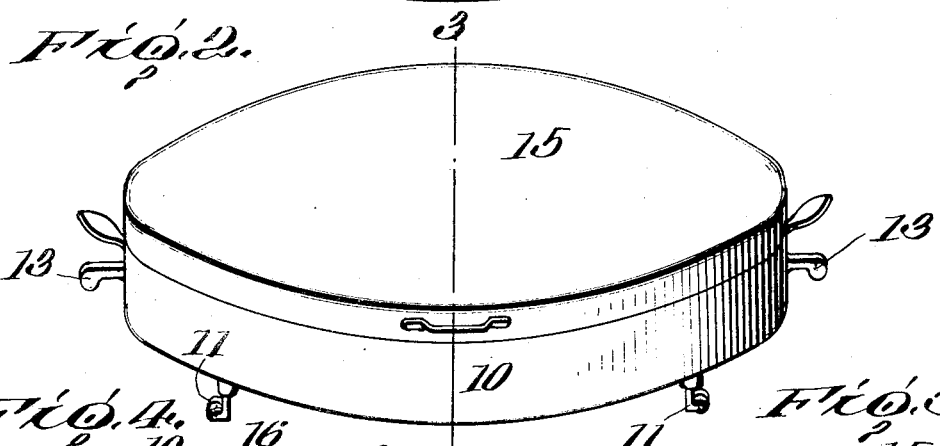
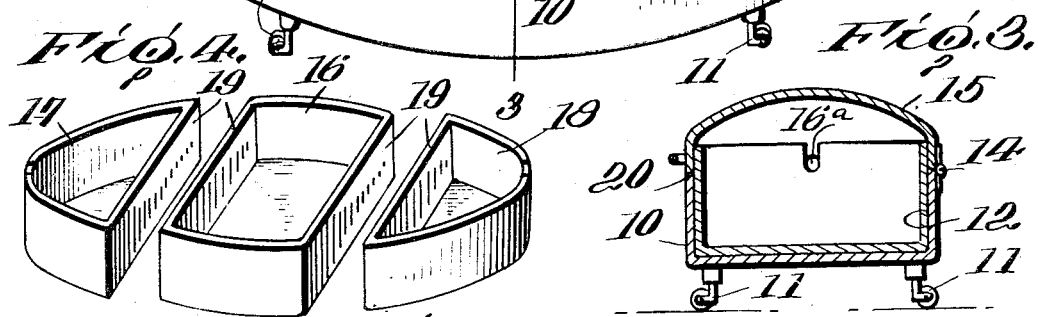
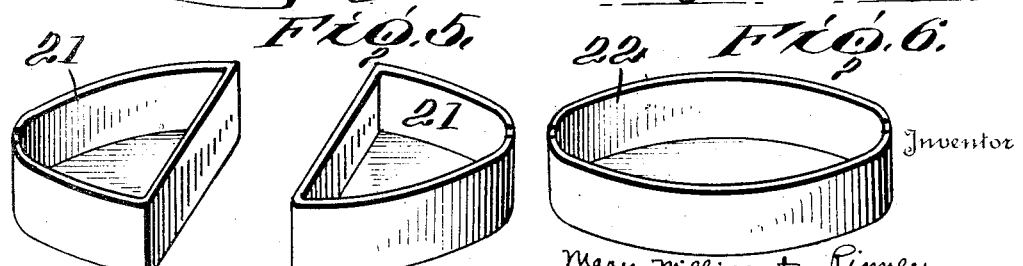
Inventor
Mary Millicent Pinney
By Wm S. Hodges
Attorney Patented July 17, 1928.

1,677,845

UNITED STATES PATENT OFFICE.

MARY MILLICENT PINNEY, OF HAGERSTOWN, MARYLAND.

SERVING DISH.

Application filed November 4, 1927. Serial No. 231,013.

This invention is a device in which one or more hot or cold articles of foods may be placed, so that they may be conveniently passed from one person to another, seated around a table during a meal.

One of the objects of the invention is to provide a carrier receptacle mounted upon wheels or casters, so that it may be readily rolled over a table, said receptacle being equipped with one or more removable dishes or containers in which different foods may be placed, and which are shaped to be conveniently stored within said carrier. A further object is to provide a carrier receptacle of the character described, having a cover positioned to cooperate with the receptacle in such a manner to produce a closed chamber in which hot foods may be kept warm, and by means of which the food may be protected from dust, flies, and other contaminating influences. A further object is to provide means for conveniently supporting table spoons or other similar utensils.

The invention will be hereinafter fully set forth and particularly pointed out in the claims.

In the accompanying drawing:—

Figure 1 is a perspective view illustrating a serving device constructed in accordance with the invention, the lid or cover being open. Figure 2 is a similar view with the cover closed. Figure 3 is a transverse sectional view on the line 3—3, Figure 2. Figure 4 is a perspective view illustrating three complementally-shaped dishes constructed to fit within the main carrier or receptacle. Figure 5 is a similar view of two of such dishes so shaped that they may be substituted for the three illustrated in Figure 4. Figure 6 is a perspective view illustrating a single dish to be substituted for either of the forms illustrated in Figures 4 and 5, respectively.

Referring to the drawing, 10 designates a main body or carrier-receptacle, supported by swivelled casters or wheels 11, which may be of any desired form or construction, so that the carrier 10 may be readily rolled back and forth in any direction, over a table. The shanks of said casters are mounted in bosses depending from the bottom of the receptacle 10, near the ends thereof. Said carrier may be of any desired shape or dimensions, but it is preferred to construct the same of substantially elliptical form in plan view, shaped to provide an internal chamber 12. Handles 13 are secured to the body 10 in suitable manner, so that the carrier may be lifted for transportation from the kitchen to the serving table and vice versa, and also to aid in moving the same around upon the casters 11. Hinged to one side of the carrier 10 in suitable manner as indicated at 14, is a dome-shaped cover 15, the lower edge of which rests upon the upper edge of the carrier receptacle 12. Said cover is provided, preferably at its ends with slots 16.

The chamber 12 is designed to receive and retain one or more food-containing dishes. For instance, in Figure 2, three of such dishes 16, 17 and 18 are shown, the outer contour of said dishes conforming to the contour of the walls of the chamber 12 and cover 15. To prevent shifting about of said receptacles they are provided with flat end walls 19 adapted to abut, as clearly shown in Figures 2 and 4, of the drawing. The said dishes are of greater depth than the depth of the chamber 12, so that their upper edges project well above the plane of the upper edge 20 of the receptacle 10, forming a flange contiguous to said edge, and the cover 15 is so shaped that its lower edges will engage and enclose the upwardly projecting edges of said dishes, while resting upon the edge 20. In lieu of three dishes as illustrated in Figures 2 and 4, two of the dishes 21, such as illustrated in Figure 5 may be employed, or if desired a single dish 22 such as illustrated in Figure 6 may be substituted for either of them.

In practice, one or more dishes, such as those illustrated in Figures 4, 5 and 6 are selected for use, depending upon the number of different edible articles that are to be served. These dishes are placed within the carrier receptacle 10, either before or after being filled with the desired quantities of the different articles, to be served at the table. If desired, table spoons, or other serving implements may be placed in the respective dishes, and so positioned as to project through the slots 16 of the cover when it is closed, thus providing conveniently accessible means for dishing food when the carrier is placed upon the table. When the selected foods have been placed in the various dishes and said dishes have been placed in chamber 12, the cover is closed to prevent undue escape of heat, and to also protect the food from dust, flies, and other contaminating influences. It is then carried from the kitchen to the dining table by means of the handles 13, being placed upon the table so that it may be readily rolled about upon the casters 11. Obviously, when anyone desires to be helped the serving dish may be rolled about on the table from one person to another, and the cover may be lifted and any person may help himself in an obvious manner.

The advantages of the invention will be readily understood by those skilled in the art to which it belongs. For instance, it will be noted that several foods may be served at one time and kept hot under one cover, without crowding the surface of the table with dishes, and any person around the table desiring service is readily and conveniently accommodated. Another advantage is that it saves many steps between the kitchen and the dining room, avoids useless handling of dishes during a meal, and reduces to a minimum the awkward spilling of food on the table cloth. By means of the cover, hot food is conveniently kept warm for a long period of time, and at the same time is protected from contamination while it is not being served. By providing the casters with treads of soft material in a manner well understood in the caster art, the serving dish may be conveniently moved over a table without scarring polished surfaces, and the use of table mats and doilies is rendered unnecessary.

It is to be understood that any desired food-containing dishes may be employed, of any desired relative proportions to fit within the chamber 12, the forms and number shown in the drawing having been selected for illustrative purposes, and without intention of limiting the invention thereto.

Having thus explained the nature of the invention and described an operative manner of constructing and using the same, although without attempting to set forth all of the forms in which it may be made, or all of the forms of its use, what is claimed is:—

A serving dish of the character described comprising a carrier-receptacle of substantially elliptical form in plan view, provided with a dish receiving chamber, bosses depending from the bottom of said receptacle, casters swivelled in said bosses, whereby said carrier-receptacle is mounted so that it may be conveniently moved about to various positions upon a table, a plurality of dishes removably located within said chamber, said dishes being complementally shaped with respect to said chamber and to each other, said dishes being deeper than the chamber so that their upper edges extend above the plane of the upper edge of said chamber, so as to provide a flange contiguous to said edge and a dome-like cover conforming to the shape of said carrier receptacle and hingedly connected to one side edge of said receptacle, the bottom edge of said cover being so shaped as to engage and enclose the projecting edges of said dishes while the cover is in closed position, said cover having slots in its edge to permit the handles of serving implements to project therethrough.

In testimony whereof I have hereunto set my hand.

MARY MILLICENT PINNEY.